No. 712,688. Patented Nov. 4, 1902.
A. KRANK.
RESILIENT BEARING.
(Application filed Jan. 2, 1902.)
(No Model.)
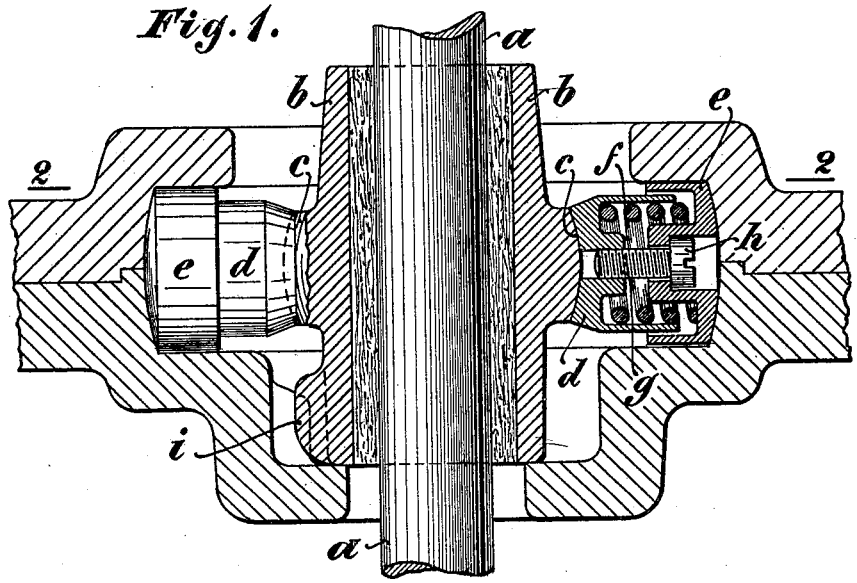
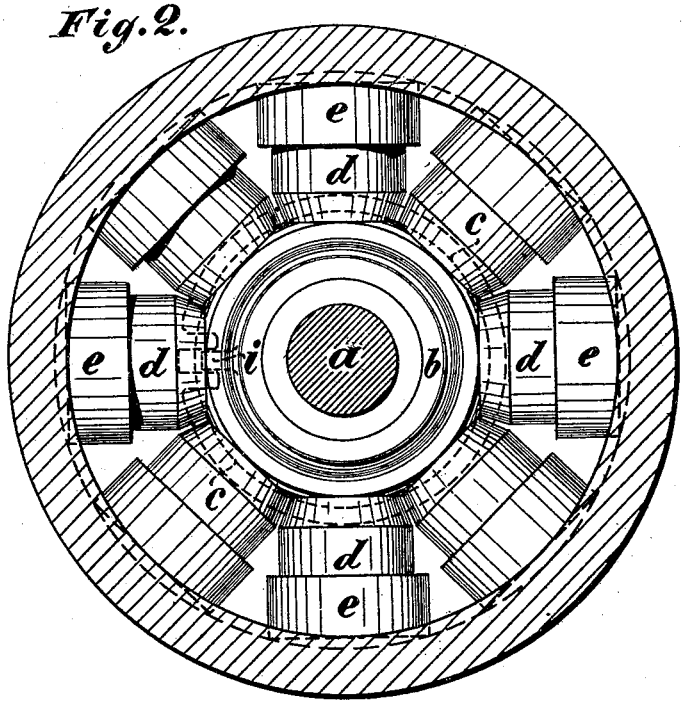
WITNESSES:
Isabella Waldron.
Adelaide Claire Gleason.
INVENTOR.
Albert Krank
BY
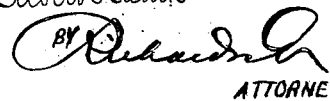
ATTORNEYS

UNITED STATES PATENT OFFICE.

ALBERT KRANK, OF WARKAUS, RUSSIA.

RESILIENT BEARING.

SPECIFICATION forming part of Letters Patent No. 712,688, dated November 4, 1902.

Application filed January 2, 1902. Serial No. 88,231. (No model.)

*To all whom it may concern:*

Be it known that I, ALBERT KRANK, a subject of the Grand Duke of Finland, residing at and whose post-office address is Warkaus, near Jorojss, Finland, Russian Empire, have invented new and useful Improvements in Resilient Bearings, of which the following is a specification.

Rigid shafts rotating at a high speed—for instance, spindles of turbines, centrifugal machines, or the like—should be journaled in resilient bearings, so that the said shafts may freely and automatically assume their natural gyratory axis. Now the known bearings of this kind are subject to the objection that the amount of the resilience cannot be regulated and that such bearings, in consequence of the unlimited or unrestricted resilient action, follow the lateral oscillations of the shaft, whereby the vibrations of the latter are increased and the adjustment of the same to the natural center of rotation unfavorably influenced.

According to the present invention the bearings for shafts rotating at high speeds are constructed in such manner that the amount of the resilience can be regulated and that the resilience itself cannot augment the amplitude of the oscillations of the shaft.

In the accompanying drawings the invention is shown in one example of construction in which similar letters denote similar parts, and in which—

Figure 1 is a side elevation, partly in section; and Fig. 2, a horizontal section on the line 2 2 of Fig. 1.

The axle box or bearing $b$ of the shaft $a$ is provided with a ring $c$, with spherical surface, against which bear correspondingly concave-shaped buffers $d$, the axle-box $b$ being prevented from rotating by a projection $i$ provided on the frame of the machine. These buffers $d$ are guided in sockets $e$, arranged in the frame of the machine, and are held by means of springs $f$ and adjustable screws $g$ in such manner that the buffers $d$ yield to the pressure exerted upon them and can be pressed into the said sockets $e$. As shown in Fig. 2, a number of such buffers $d$ are arranged around the shaft $a$ or its axle-box $b$, and the shaft is adjusted by means of the said screws $g$ of the buffers, so that when the shaft $a$ rotates at a high speed it will in consequence of the resilient bearings automatically and freely adjust itself to or assume its natural axis of gyation.

In the case of any lateral movement of the shaft the buffers located on one side of the shaft will, following this movement, be pressed together, while the buffers on the opposite side will remain in their position, being held therein by the head $h$ of the adjusting-screws bearing against the socket $e$, so that the tendency of the shaft to assume its natural axis of gyration is not influenced by the resilience of the bearing.

What I claim as my invention, and desire to secure by Letters Patent of the United States, is—

In resilient bearings for shafts, the combination with the shaft of an axle-box provided with a ring with spherical surface, correspondingly concave-shaped resilient buffers, sockets for guiding the buffers, springs for pressing the buffers against the axle-box and screws adjustable in the buffers the heads of which screws bear against the sockets, essentially as and for the purpose described.

In testimony whereof I have hereunto set my hand in presence of two subscribing witnesses.

ALBERT KRANK.

Witnesses:
 WOLDEMAR HAUPT,
 HENRY HASPER.